April 28, 1970 — A. EISENMAN — 3,508,424
LOCK FOR VEHICLE TRANSMISSION CONTROL LEVER
Original Filed Feb. 16, 1967
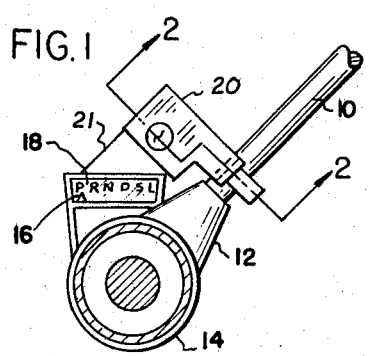
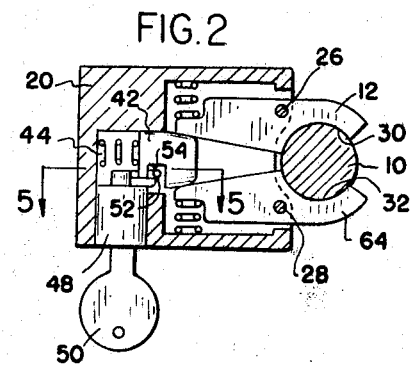
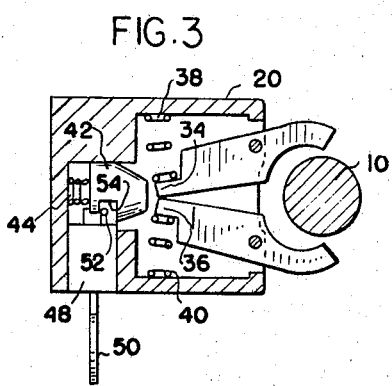
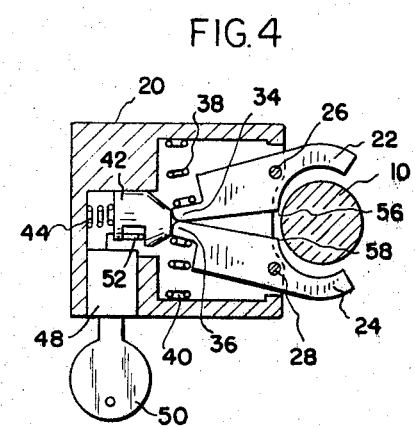
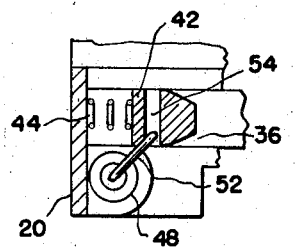
INVENTOR
ARNOLD EISENMAN
BY Hauke, Krass, Gifford, & Patalidis
ATTORNEYS

United States Patent Office 3,508,424
Patented Apr. 28, 1970

3,508,424
LOCK FOR VEHICLE TRANSMISSION CONTROL LEVER
Arnold Eisenman, 18636 Cherrylawn Ave., Detroit, Mich. 48221
Original application Feb. 16, 1967, Ser. No. 616,522, now Patent No. 3,431,755, dated Mar. 11, 1969. Divided and this application Mar. 7, 1968, Ser. No. 711,424
Int. Cl. E05b 65/12; B60r 25/06
U.S. Cl. 70—202        2 Claims

ABSTRACT OF THE DISCLOSURE

A locking mechanism for clamping the transmission control lever of a vehicle in position when it is in a selected angular position such as the "park" position. The control lever is released by unlocking a key-actuated lock element. The mechanism is spring loaded so that the lock element can be manipulated into a locked condition when the control lever is out of the "park" position but is tripped when the control lever is moved into the park position.

CROSS REFERENCE TO RELATED APPLICATIONS

This application is a division of my application for motor vehicle lock Ser. No. 616,522 filed Feb. 16, 1967 now U.S. Patent No. 3,431,755 issued Mar. 11, 1969.

BACKGROUND OF THE INVENTION

This invention relates to mechanisms for clampingly engaging the manual transmission control lever of a motor vehicle in one of its operative positions so that the vehicle cannot be operated by an unauthorized person.

The present invention is particularly adapted to motor vehicles having an automatic transmission with the control lever mounted on the steering column of the vehicle. When the control lever is positioned between selected angular positions, suitable control linkage connecting the lever to the transmission is adapted to place the transmission in a corresponding operating condition. Most vehicles have a control lever which can be displaced to a "park" position which effectively immobilizes the vehicle so that it cannot be driven until the control lever is moved to another position. The broad purpose of the present invention is to provide an anti-theft device which locks the control lever in a predetermined position and preferably the "park" position so that the vehicle cannot be operated by an unauthorized person.

SUMMARY

The preferred embodiment of the present invention, which will be subsequently described in greater detail, takes the form of a pair of lever-like clamping members pivotally mounted adjacent the "park" position of the transmission control lever. The clamping members are mounted in the manner of a pair of first class levers and have a companion pair of ends adapted for receiving the control lever between them when they are in an open position, and their intermediate portions pivotally mounted so that their opposite ends abut one another when their lever receiving ends are open.

A spring-loaded wedge member mounted adjacent the abutting ends of the clamping members is coupled with a key-actuated lock element. When the lock element is placed in its lock condition by the operator of the vehicle and the control lever is moved into its "park" position, the control lever causes the two clamping members to close slightly so that their opposite ends open sufficiently to permit the wedge member to be forced between them. As the wedge member forces the ends of the clamping members apart, their lever engaging ends clampingly engage the control lever and prevent it from being moved to any of the driving positions. The operator releases the control lever by actuating the key element so that it withdraws the wedge from between the clamping members.

The preferred locking mechanism can be readily adapted to the control lever of most conventional automatic transmissions and is composed of a relatively few components which readily lend themselves to an economical manufacture. It can be easily mounted on existing motor vehicles as well as incorporated in future designs. Still other advantages of the present invention will become obvious to those skilled in the art to which the invention pertains upon reference to the following detailed description of the preferred embodiment.

DESCRIPTION OF THE DRAWINGS

The description refers to the accompanying drawings wherein like reference to characters refers to like parts throughout the several views and in which:

FIGURE 1 is an elevational view showing a motor vehicle transmission control lever and a locking mechanism for engaging the control lever illustrating the preferred embodiment of the invention;

FIGURE 2 is a view as seen along lines 2—2 of FIGURE 1, with the lever locked in position;

FIGURE 3 is a view similar to FIGURE 2 but showing the clamping members in their open condition;

FIGURE 4 is a view similar to FIGURE 2 but showing the clamping members in the open position and the lock element in its locked condition; and FIGURE 5 is a view as seen along lines 5—5 of FIGURE 2.

DESCRIPTION OF THE PREFERRED EMBODIMENT

Referring to the drawings, FIGURE 1 shows a motor vehicle transmission control as comprising a control lever 10 mounted by support means 12 on the steering column jacket 14 of the motor vehicle. The support means 12 permits the control lever 10 to be displaced between a series of angular positions about the axis of the steering column jacket 14 and is coupled through a suitable linkage (not shown) to the transmission so that the operative condition of the transmission corresponds to the angular position of lever 10. Thus the motor vehicle transmission can be shifted to a selected one of several driving modes, such as park, reverse, neutral, drive, etc. The position occupied by the control lever 10 is visually displayed by a pointer 16 which cooperates with a dial 18.

A housing 20 is fixedly mounted as by brackets 21 to the steering column jacket 14 adjacent the "park" position of the lever 10. A pair of cooperating clamping members 22 and 24 are pivotally mounted as by pins 26 and 28 to the housing 20 in the manner of a pair of first class levers. The outer ends of the clamping members have arcuate portions 30 and 32 adapted to engage the lever 10. The clamping members 22 and 24 are pivotal so that the arcuate portions 30 and 32 move toward and away from one another between an open position where they are spaced a sufficient distance to permit the control lever 10 to be moved into its "park" position between the clamping members, and a closed position where they engage the control lever 10 as shown in FIGURE 2.

As best seen in FIGURES 3 and 4, when the clamping members are in their open position, their opposite ends 34 and 36 abut one another. A pair of spring members 38 and 40 mounted in the housing urge the ends 34 and 36 toward an abutting position so that the portions 30 and 32 are normally biased toward their open position.

A wedge member 42 having a tapered nose is movably mounted in the housing 20 for movement between the ends 34 and 36 when the clamping members are in their open position as can best be seen in FIGURE 2. A spring member 44 biases the wedge member toward its position between the ends 34 and 36. A lock element 48 adapted for actuation by manually operated, removable key 50 is mounted in the housing 20 adjacent the wedge member 42 and has an actuating arm 52 engaged in a slot 54 of the wedge member 42.

Wedge member 42 is movable between 3 positions. The first of these positions is a fully retracted position, best illustrated in FIGURE 3, where it is spaced from the ends 34 and 36 of the clamping members and is drawn to this position by the arm 52 of the lock element as the key 50 is manipulated to its unlocked condition. In this position the control lever 10 can move into and out of its "park" position without actuating the locking mechanism.

When lock element 48 is actuated to its locked condition by manipulation of the key 50 so that the lever arm 52 is moved toward the right as best viewed in FIGURE 4, the wedge member 42 under the influence of the spring 44 shifts toward the clamping members so that its tapered nose abuts the ends 34 and 36. However, because the ends 34 and 36 are in abutment, the wedge member cannot move between them. In this position and with the control lever 10 in a position other than the "park" position, the locking mechanism is in essentially a spring-loaded condition. Manipulation of the control lever 10 between arcuate portions 22 and 24 of the clamping members toward the "park" position brings the control lever into contact with a pair of tripping sections 56 and 58 on the clamping members 22 and 24. The tripping sections 56 and 58 are formed in such a manner that an abutment established with the control lever 10 causes the clamping members to pivot so that the ends 34 and 36 move away from one another against the bias of the springs 38 and 40 a sufficient distance to admit the tapered nose of the wedge member 42 between them. Under the influence of the spring 44, the wedge member then forces the ends 34 and 36 apart so that the ends 22 and 24 pivot and clampingly engage control lever 10. This position of the wedge member is best illustrated in FIGURE 2. The clamping members 22 and 24 then remain in this position with the control lever 10 locked against motion in the "park" position until the operator inserts the key 50 into the lock element 48 and manipulates the lock element so that the arm 52 withdraws the wedge member 42 from between the clamping members so as to release the control lever 10.

Although I have described but one embodiment of my invention, it is to be understood that various changes and revisions can be made therein without departing from the spirit of the invention.

I claim:

1. In combination with a motor-vehicle transmission control lever displaceable between angular positions for shifting the transmission between corresponding operative conditions, a locking mechanism comprising:
    support housing for mounting in a vehicle;
    a pair of symmetrically disposed clamping members, each pivotally mounted in said housing at a point intermediate its ends and having its outer end provided with an arcuate portion adapted to engage the control lever for motion between an open position wherein said arcuate portions are spaced from one another a sufficient distance for the control lever to move between them in one of its angular positions, and a closed position wherein said arcuate portions clamp the lever between them, each of said arcuate portions having an abutment for engaging the control lever as it is inserted between said arcuate portions so as to move said arcuate portions toward a closed position;
    a pair of spring members mounted in said housing and engaging the inner ends of said clamping members for biasing said clamping members toward their open position;
    a wedge member slidably mounted in said housing and having a tapered nose formed on one end and a slot formed in the side of said wedge member;
    a spring member mounted in said housing and engaging said wedge member for biasing said wedge member toward a position in which said tapered nose will engage said inner ends of said clamping members; and
    a key-operated lock element mounted in said housing and having a locked and unlocked condition, said lock element including an actuating arm operated by said lock element and having one end engaging said slot in said wedge member for sliding said wedge member away from said inner ends of said clamping members when said lock element is actuated to the unlocked condition, and sliding said wedge member toward said inner ends of said clamping members to allow said tapered nose to abut said inner ends when said lock element is actuated to the locked position, whereby said tapered nose moves between said inner ends of said clamping members to maintain said clamping members in their closed condition when the control lever is moved between said arcuate portions.

2. The combination as defined in claim 1, wherein said control lever is displaceable between a plurality of predetermined angular positions including a "park" position and wherein said clamping members are engageable with said transmission control lever when the lever is in "park" position.

References Cited

UNITED STATES PATENTS

| 1,165,352 | 12/1915 | Whiteside | 70—202 |
| 2,151,181 | 3/1939 | Appell | 280—33.1 |
| 2,646,299 | 7/1953 | Kramer | 292—44 |
| 2,859,995 | 11/1958 | Rigaud | 292—53 |
| 2,943,878 | 7/1960 | Rigaud | 292—44 |

FOREIGN PATENTS

| 12,223 | 7/1895 | Great Britain. |
| 831,063 | 3/1960 | Great Britain. |

MARVIN A. CHAMPION, Primary Examiner

R. L. WOLFE, Assistant Examiner

U.S. Cl. X.R.

70—247